（12）United States Patent
Li

(10) Patent No.: US 11,520,422 B2
(45) Date of Patent: Dec. 6, 2022

(54) TOUCH DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Yuanhang Li, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 74 days.

(21) Appl. No.: 16/972,554

(22) PCT Filed: Jun. 18, 2020

(86) PCT No.: PCT/CN2020/096680
§ 371 (c)(1),
(2) Date: Dec. 4, 2020

(87) PCT Pub. No.: WO2021/217819
PCT Pub. Date: Nov. 4, 2021

(65) Prior Publication Data
US 2022/0187935 A1 Jun. 16, 2022

(30) Foreign Application Priority Data
Apr. 28, 2020 (CN) .......................... 202010351578.7

(51) Int. Cl.
*G06F 3/041* (2006.01)
*G06F 3/044* (2006.01)

(52) U.S. Cl.
CPC .......... *G06F 3/0412* (2013.01); *G06F 3/0445* (2019.05); *G06F 3/0446* (2019.05); *G06F 2203/04112* (2013.01)

(58) Field of Classification Search
CPC .... G06F 3/0412; G06F 3/0445; G06F 3/0446; G06F 2203/04112
See application file for complete search history.

(56) References Cited

U.S. PATENT DOCUMENTS 10,606,426 B2  3/2020  Nakamura
2015/0346874 A1  12/2015  Park et al.
(Continued)

FOREIGN PATENT DOCUMENTS

CN  105867035 A  8/2016
CN  104011635 B  5/2017
(Continued)

*Primary Examiner* — Deeprose Subedi
(74) *Attorney, Agent, or Firm* — PV IP PC; Wei Te Chung; Ude Lu

(57) ABSTRACT

A touch display device is provided by the present application, including a display module and a touch module stacked, the touch module includes a first touch electrode layer, a second touch electrode layer, and an insulating layer; and each of first leads of the first touch electrode layer extends from one of first touch electrodes to a bonding area and extends to the second touch electrode layer through a via provided in the insulating layer to electrically connect one of pads, and each of second leads of the second touch electrode layer extends from one of second touch electrodes to the bonding area to electrically connect one of the pads.

15 Claims, 11 Drawing Sheets

(56) References Cited

U.S. PATENT DOCUMENTS

2018/0350885 A1    12/2018   Choi et al.
2021/0333942 A1*  10/2021   Zhang .................. G06F 3/0446

FOREIGN PATENT DOCUMENTS

| | | |
|---|---|---|
| CN | 107111392 A | 8/2017 |
| CN | 107206769 A | 9/2017 |
| CN | 207541605 U | 6/2018 |
| CN | 108469922 A | 8/2018 |
| CN | 108536329 A | 9/2018 |
| CN | 108762542 A | 11/2018 |
| CN | 208903230 U | 5/2019 |
| CN | 110908541 A | 3/2020 |
| TW | 201301471 A | 1/2013 |
| WO | 2015083410 A1 | 6/2015 |

\* cited by examiner

TOUCH DISPLAY DEVICE

RELATED APPLICATIONS

This application is a Notional Phase of PCT Patent Application No. PCT/CN2020/096680 having international filing date of Jun. 18, 2020, which claims the benefit of priority of Chinese Patent Application No. 202010351578.7.0 filed on Apr. 28, 2020. The contents of the above applications are all incorporated by reference as if fully set forth herein in their entirety.

BACKGROUND OF INVENTION

Field of Invention

This application relates to field of displays, and particularly relates to a touch display device.

Description of Prior Art

Organic light emitting diode on-cell touch (OLED on-cell touch) display technology, also called direct on-cell touch (DOT) technology, integrates OLED display panels with touch structures. Compared to out-cell touch panel technology, DOT technology has merits of higher transmittance, flexibility, light weight, and thinness, etc., and has become a future trend of flexible OLED displays. The DOT technology refers to forming a touch structure directly on a thin-film encapsulation (TFE) with low temperature processes (in which temperature is lower than or equal to 90° C.) to integrate OLEDs and touch structures. A known structure of DOT touch display panels is shown in FIG. 1, in which an OLED panel 10, a TFE encapsulation layer 20, an insulating layer 30, and a touch module 40 are sequentially stacked. The touch module 40 includes a plurality of driving electrodes 41 and a plurality of sensing electrodes 42 disposed on the insulating layer 30, and a plurality of bridge electrodes 43 disposed on the encapsulation layer 20 and covered by the insulating layer 30. The driving electrodes 41 and the sensing electrodes 42 are disposed on a same layer. A plurality of vias 31 are provided in the insulating layer 30. Each two adjacent driving electrodes 41 or each two adjacent sensing electrodes 42 are connected to one of the bridge electrodes 43 through one of the vias 31 to electrically connect to each other. An example that the driving electrodes 41 are connected by the bridge electrodes 43 is illustrated in the FIG. 1. The vias 31 are formed in the insulating layer 30 by dry etching processes to bridge connect the driving electrodes 41 with the bridge electrodes 43. To ensure conduction effect, a metal width of the driving electrodes 41 at bridge connecting positions is greater than that of other positions considering alignment tolerance. This technology brings following defects: a width of bridge conduction points at the bridge connecting positions of the driving electrodes 41 or the sensing electrodes 42 is greater than metal width at other positions, resulting in a difference of optical properties from those at non-bridge connecting positions while pixels emit light. The higher the touch accuracy is, the more touch electrodes there are, the more metal bridge contacts there are, and the more dry etched via positions there are in the process, and etching depths differ between a display area and a binding (pad-bonding) area. In order to ensure uniformity of via depths for conduction of the touch electrodes, the low-temperature dry etching processes face great challenges, and there is high risk in touch failure. Especially in advanced generation line processes, risks in the low-temperature dry etching processes have a great effect on yield. Under the low-temperature processes, a large number of bridge electrodes 43 and vias 31 are weak in structural strength, resulting in high risks of open circuit in flexible screens.

In view of this, the present application aims to provide a touch display device which can improve light-emitting uniformity, yield, and bending reliability.

SUMMARY OF INVENTION

A touch display device, comprising a display module and a touch module stacked, wherein the touch module comprises a first touch electrode layer, a second touch electrode layer, and an insulating layer located between the first touch electrode layer and the second touch electrode layer;

the touch display device comprises a touch display area and a bonding area located on a side of the touch display area, a plurality of pads are configured in the bonding area, and the pads are disposed on the second touch electrode layer;

the first touch electrode layer comprises a plurality of first touch electrodes and a plurality of first leads each connected to one of the first touch electrodes;

the second touch electrode layer comprises a plurality of second touch electrodes and a plurality of second leads each connected to one of the second touch electrodes; and each of the first leads extends from one of the first touch electrodes to the bonding area and extends to the second touch electrode layer through a via provided in the insulating layer to electrically connect one of the pads, and each of the second leads extends from one of the second touch electrodes to the bonding area to electrically connect one of the pads.

In one embodiment, each of the first touch electrodes and the second touch electrodes is configured as a metal mesh structure, the first touch electrode layer comprises a plurality of first touch metal wires and a plurality of second touch metal wires intersecting each other, the plurality of first touch metal wires and the plurality of second touch metal wires intersect each other to form a plurality of first touch patterns arranged in an array, the plurality of first touch metal wires extend along a first direction and are arranged at intervals along a second direction, and the plurality of second touch metal wires extend along the second direction and are arranged at intervals along the first direction;

the second touch electrode layer comprises a plurality of third touch metal wires and a plurality of fourth touch metal wires intersecting each other, the plurality of third touch metal wires and the plurality of fourth touch metal wires intersect each other to form a plurality of second touch patterns arranged in an array, the plurality of third touch metal wires extend along the first direction and are arranged at intervals along the second direction, and the plurality of fourth touch metal wires extend along the second direction and are arranged at intervals along the first direction; and in a top view, the first touch metal wires and the third touch metal wires are arranged at intervals according to a certain rule, and the second touch metal wires and the fourth touch metal wires are arranged at intervals according to a certain rule.

In one embodiment, in the top view, the first touch metal wires and the third touch metal wires are arranged alternately at intervals in an order of one of the first touch metal wires by one of the third touch metal wires, and the second touch metal wires and the fourth touch metal wires are arranged alternately at intervals in an order of one of the second touch metal wires by one of the fourth metal wires.

In one embodiment, the first touch pattern has a shape of diamond, and the second touch pattern also has a shape of diamond, and a size of the first touch pattern is same as that of the second touch pattern, in the top view, a center of each of the first touch patterns overlaps an endpoint of one of the second touch patterns, and a center of the second touch pattern overlaps an endpoint of the first touch pattern.

In one embodiment, in the top view, in the top view, the first touch metal wires and the third touch metal wires are arranged alternately at intervals in an order of two of the first touch metal wires by two of the third touch metal wires, and the second touch metal wires and the fourth touch metal wires are arranged alternately at intervals in an order of two of the second touch metal wires by two of the fourth touch metal wires.

In one embodiment, the first touch pattern comprises a big diamond formed by two of the first touch metal wires and two of the second touch metal wires intersecting each other, and one of the first touch metal wires and one of the second touch metal wires are located on a position of one quarter length of each side of an included angle of the big diamond to divide the big diamond to two small diamonds connected to each other and two parallelograms on both sides of the two small diamonds;

the second touch pattern also comprises a big diamond formed by two of the first touch metal wires and two of the second touch metal wires intersecting each other, and one of the first touch metal wires and one of the second touch metal wires are located on a position of one quarter length of each side of an included angle of the big diamond to divide the big diamond to two small diamonds connected to each other and two parallelograms on both sides of the two small diamonds; and a size of the first touch pattern is same as that of the second touch pattern; and a vertex of the included angle of the first touch pattern is defined as a first endpoint, a vertex opposite to the included angle of the first touch pattern is defined as a second endpoint, a vertex of the included angle of the second touch pattern is defined as a first endpoint, a vertex opposite to the included angle of the second touch pattern is defined as a second endpoint, in the top view, the first endpoint of each of the first touch patterns overlaps a center of one of the second touch patterns, and a center of the first touch pattern overlaps the second endpoint of the second touch pattern.

In one embodiment, in the top view, the first touch metal wires and the third touch metal wires are arranged alternately at intervals in an order of two of the third touch metal wires, by two of the first touch metal wires, by one of the third touch metal wires, and by one of the first touch metal wires, and the second touch metal wires and the fourth touch metal wires are arranged alternately at intervals in an order of two of the second touch metal wires, by two of the fourth touch metal wires, by one of the second touch metal wires, and by one of the fourth touch metal wires.

In one embodiment, the first touch pattern comprises a big diamond formed by two of the first touch metal wires and two of the second touch metal wires intersecting each other, and two of the first touch metal wires and two of the second touch metal wires are located on positions of one-sixth length and one-half length of each side of an included angle of the big diamond to divide the big diamond to three small diamonds connected to each other and four parallelograms on both sides of the three small diamonds, the second touch pattern also comprises a big diamond formed by two of the third touch metal wires and two of the fourth touch metal wires intersecting each other, and two of the third touch metal wires and two of the fourth touch metal wires are located on positions of one-sixth length and one-half length of each side of an included angle of the big diamond to divide the big diamond to three small diamonds connected to each other and four parallelograms on both sides of the three small diamonds; and a size of the first touch pattern is same as that of the second touch pattern; and a vertex of the included angle of the first touch pattern is defined as a first endpoint, a vertex opposite to the included angle of the first touch pattern is defined as a second endpoint, a vertex of the included angle of the second touch pattern is defined as a first endpoint, a vertex opposite to the included angle of the second touch pattern is defined as a second endpoint, in the top view, the second endpoint of the second touch pattern is located on a position of a diagonal of the first touch pattern which is one-sixth of a length of the diagonal from the first endpoint, and the second endpoint of the first touch pattern is located on a position of a diagonal of the second touch pattern which is one-sixth of a length of the diagonal from the first endpoint.

In one embodiment, the first touch electrode layer comprises the plurality of first touch electrodes and a plurality of first dummy electrodes each disposed between two adjacent first touch electrodes, the first dummy electrodes are insulated from the first touch electrodes through a plurality of first breakages provided in the first touch metal wires, and the second touch electrode layer comprises the plurality of second touch electrodes and a plurality of second dummy electrodes each disposed between two adjacent second touch electrodes, the second dummy electrodes are insulated from the first touch electrodes through a plurality of second breakages provided in the second touch metal wires.

In one embodiment, the plurality of first touch electrodes form a plurality of strip, diamond, or branch patterns due to the plurality of first breakages. In one embodiment, the plurality of second touch electrodes form a plurality of strip, diamond, or branch patterns due to the plurality of second breakages.

In one embodiment, the display module comprises a plurality of sub-pixels in a Pentile arrangement, in the top view, each of the sub-pixels is surrounded by the touch metal wires.

In one embodiment, the plurality of sub-pixels in the Pentile arrangement is configured according to following way: a plurality of first pixels each comprising a green sub-pixel and a red sub-pixel are arranged along a third direction at intervals, a plurality of second pixels each comprising a green sub-pixel and a blue sub-pixel are arranged along the third direction at intervals, a column of the first pixels and a column of the second pixels are arranged along the fourth direction at intervals.

In one embodiment, in the top view, each of the first touch patterns surrounds four sub-pixels comprising two green sub-pixels, one red sub-pixel R, and one blue sub-pixel, and each of the second touch pattern surrounds four sub-pixels comprising two green sub-pixels, one red sub-pixel and one blue sub-pixel.

In one embodiment, in the top view, each of the first touch patterns surrounds sixteen sub-pixels comprising eight green sub-pixels G, four red sub-pixels R, and four blue sub-pixels B, and each of the second touch patterns surrounds sixteen sub-pixels comprising eight green sub-pixels G, four red sub-pixels R and four blue sub-pixels B.

In one embodiment, in the top view, each of the first touch patterns surrounds thirty-six sub-pixels comprising eighteen green sub-pixels G, nine red sub-pixels R, and nine blue sub-pixels B, and each of the second touch pattern surrounds thirty-six sub-pixels comprising eighteen green sub-pixels G, nine red sub-pixels R and nine blue sub-pixels.

Compared to prior art, the touch driving electrodes and the touch sensing electrodes of on-cell touch are disposed on different layers according to the touch display devices provided by the present application, which can prevent inconsistency of optical effect induced by metal bridge connecting point in single-layer bridge connecting by vias design. As the single-layer bridge connecting by vias design is avoided, risks in low-temperature dry etching processes are greatly reduced and bending reliability of flexible DOT panels is improved. Besides, due to metal mesh electrode structures arranged according to certain rules, Moire fringes caused by overlapping of upper and lower metal mesh which affects optical effect can be prevented.

BRIEF DESCRIPTION OF DRAWINGS

In order to more clearly illustrate the technical solution of the present application, a brief description of the drawings that are necessary for the illustration of the embodiments will be given as follows. Obviously, the drawings described below show only some embodiments of the present invention, and a person having ordinary skill in the art may also obtain other drawings based on the drawings described without making any creative effort.

DETAILED DESCRIPTION OF PREFERRED EMBODIMENTS

The present disclosure is further described in detail below with reference to the accompanying drawings and embodiments. Obviously, the following described embodiments are only part of the present disclosure but not all. A person having ordinary skill in the art may obtain other embodiments based on the embodiments provided in the present disclosure without making any creative effort, which all belong to the scope of the present disclosure.

Figure 1:
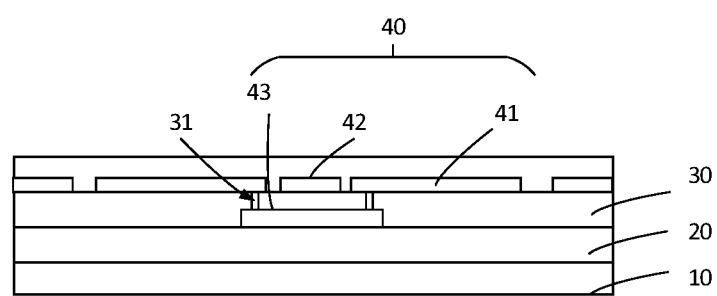
FIG. 1 is a structural schematic diagram of a touch display device in prior art.
Figure 2:
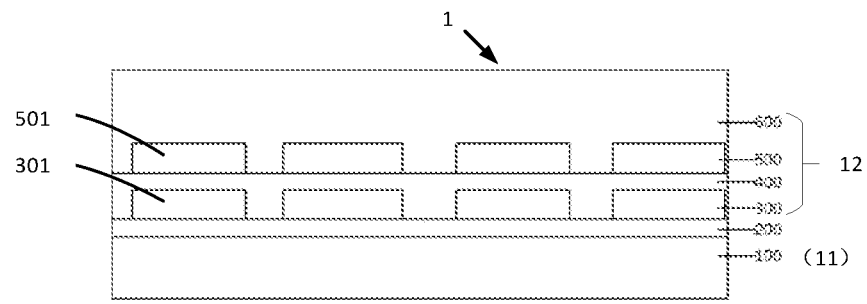
FIG. 2 is a structural schematic diagram of a touch display device according to a first embodiment of the present application.

Please refer to FIG. 2, a touch display device 1 is provided by the first embodiment of the present application, which includes a display module 11 and a touch module 12. The display module 11 and the touch module 12 are stacked. Wherein the display module 11 can be active light-emitting display modules, for example an OLED display module, a micro-LED display module, or a mini-LED display module, etc. In one embodiment, the display module 11 can also be passive light-emitting display modules, for example, a liquid crystal display module. The display module 11 can be flexible display modules, and can also be non-flexible display modules. In this embodiment, the display module 11 can be an active light-emitting flexible display module. The display module 11 includes an OLED display panel 100. Although not shown in figures, the OLED display panel 100 includes a substrate, a driving circuit layer disposed on the substrate, a plurality of organic light-emitting units mounted on the driving circuit layer, and a thin-film encapsulation layer etc. A first insulating layer 200 is disposed between the display module 11 and the touch module 12. That is to say, the first insulating layer 200 disposed between the OLED display panel 100 and the touch module 12 is also included.

The touch module 12 includes a first touch electrode layer 300, a second insulating layer 400, and a second touch electrode layer 500 sequentially stacked. In the embodiment, the first touch electrode layer 300 is located between the display module 11 and the second touch electrode layer 500. In other embodiments, the second touch electrode layer 500 can be located between the display module 11 and the first touch electrode layer 300. One of the first touch electrode layer 300 and the second touch electrode layer 500 is a touch driving electrode layer, and the other one is a touch sensing electrode layer. In one embodiment of the present application, the one of the first touch electrode layer 300 or the second touch electrode layer 500 close to the display module 11 is the touch driving electrode layer, and the one away from the display module 11 is the touch sensing electrode layer.

Besides, a third insulating layer 600 disposed on a side of the touch module 12 away from the display module 11 is also included. The third insulating layer 600 is an overcoating layer which is also called an organic flat protective layer.

Materials of the first insulating layer 200, the second insulating layer 400, and the third insulating layer 600 include organic insulating materials or inorganic insulating materials. Gold, silver, copper, lithium, sodium, potassium, magnesium, aluminum, zinc, and combinations thereof can be used as materials of the first touch electrode layer 300 and the second touch electrode layer 500, and conductive metal materials such as indium tin oxide, aluminum doped zinc oxide, antimony doped tin oxide, and combinations thereof can also be used.

Figure 3:
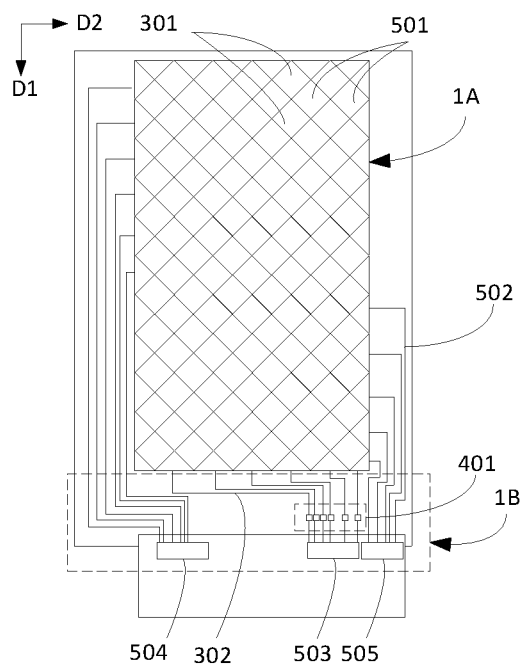
FIG. 3 is a top view of the touch display device of FIG. 2.

Please refer to FIG. 3, the touch display device 1 includes a touch display are 1A and a bonding area 1B located on a side of the touch display area 1A. A plurality of pads are disposed in the bonding area 1B. The pads and the second touch electrode layer 500 are located on a same layer.

The first touch electrode layer 300 includes a plurality of first touch electrodes 301 and a plurality of first leads 302 each connected to one of the first touch electrodes 301. The second touch electrode layer 500 includes a plurality of second touch electrodes 501 and a plurality of second leads 502 each connected to one of the second touch electrodes 501. The first leads 302 and the second leads 502 are metal leads. One of the first touch electrodes 301 or the second touch electrode 501 is a touch driving electrode, and the other one is a touch sensing electrode. The first touch electrode 301 and the second touch electrode 501 together constitute a matrix projection capacitor. The first touch electrode 301 and the second touch electrode 501 can be formed as a diamond or a strip pattern etc. In this embodiment, each of the first touch electrode 301 has a shape of diamond and the first touch electrodes 301 are arranged along a first direction D1. Each of the second touch electrode 501 also has a shape of diamond and the second touch electrodes 501 are arranged along a second direction D2. The first direction D1 is perpendicular to the second direction D2. In one embodiment, the first direction D1 is vertical, and the second direction D2 is horizontal. The pads include a plurality of first pads 503 each configured to connect one of the first touch electrodes 301, and a plurality of second pads 504, 505 each configured to connect one of the second touch electrodes 501. The second pads 504 and the second pads 505 are disposed on both sides of the first pads 503, and the second pads 504 are configured to connect the second touch electrodes 501 located on an upper part and the second pads 504 are configured to connect the second touch electrodes 501 located on a lower part. Each of the first leads 302 extends from one of the first touch electrodes 301 to the bonding area 1B, and extends to the second touch electrode layer 500 through a via 401 provided in the second insulating layer 400 to electrically connect one of the first pads 503 so as to electrically connect a touch controlling circuit (not shown in the figures). Each of the second leads 502 extends from one of the second touch electrodes 501 to the bonding area 1B to electrically connect one of the second pads 504, 505 so as to electrically connect the touch controlling circuit (not shown in the figures).

In other embodiments, the second touch electrode layer 500 is located between the display module 11 and the first touch electrode layer 300. Similarly, each of the first leads 302 extends from one of the first touch electrodes 301 to the bonding area 1B, and extends to the second touch electrode layer 500 through a via 401 provided in the second insulating layer 400 to electrically connect one of the first pads 503 so as to electrically connect the touch controlling circuit (not shown in the figures).

The touch driving electrodes and the touch sensing electrodes of on-cell touch are disposed on different layers according to the touch display devices provided by the present application, which can prevent inconsistency of optical effect induced by metal bridge connecting point in single-layer bridge connecting by vias design. As the single-layer bridge connecting by vias design is avoided, risks in low-temperature dry etching processes are greatly reduced and bending reliability of flexible DOT panels is improved.

Figure 4:
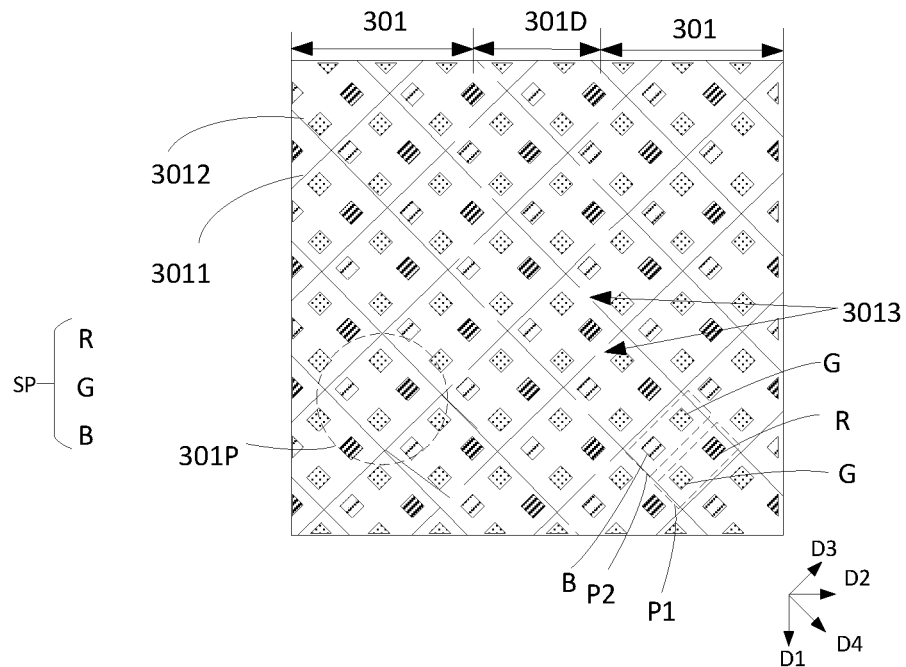
FIG. 4 is a top view of a first touch electrode layer and a pixel matrix of the touch display device according to another embodiment of the present application.
Figure 5:
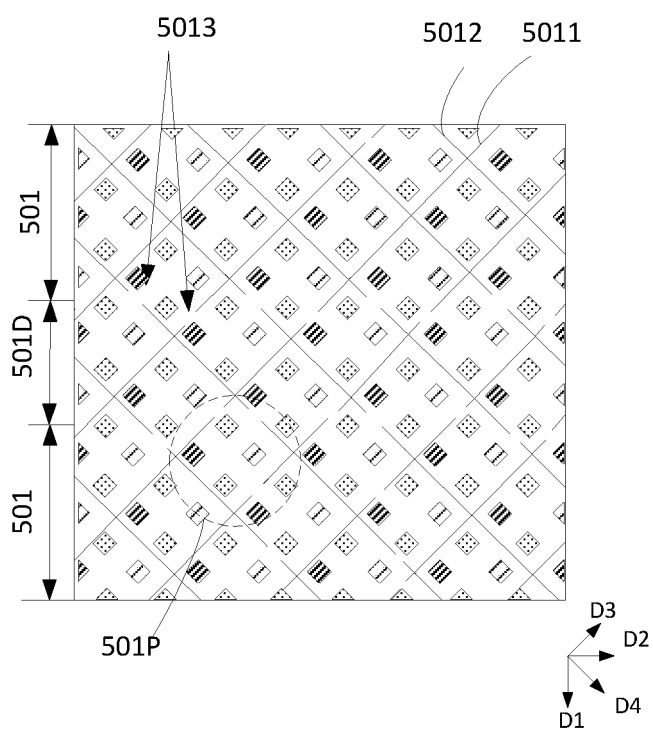
FIG. 5 is a top view of a second touch electrode layer and the pixel matrix of the touch display device of FIG. 4.
Figure 6:
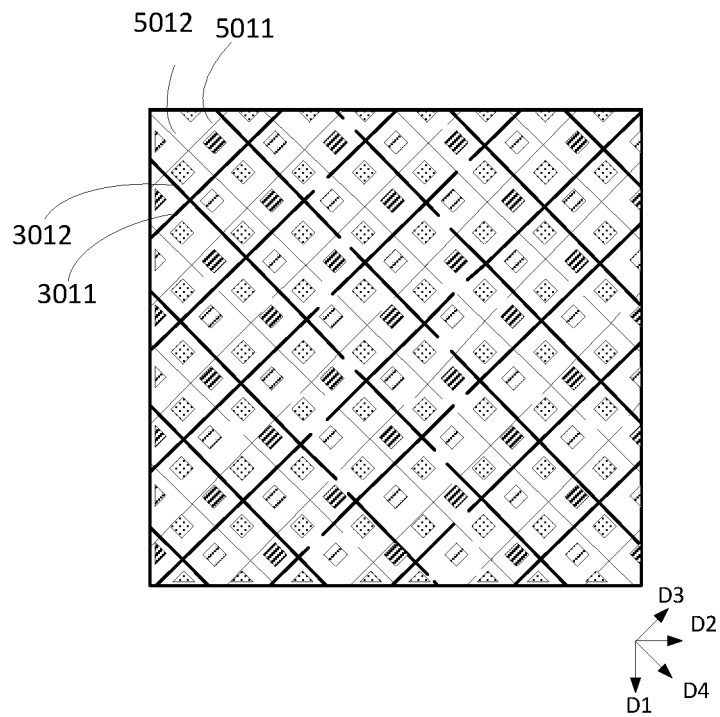
FIG. 6 is a top view of the first touch electrode layer, the second touch electrode layer, and the pixel matrix of the touch display device of FIG. 4.

Please refer to FIG. 4 to FIG. 6, in another embodiment of the present application, in order not to affect light emitting of the display module 11, each of the first touch electrodes 301 and the second touch electrodes 501 is configured as a metal mesh structure.

Figure 7:
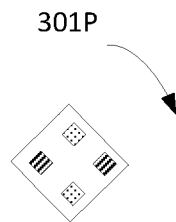
FIG. 7(a) is a top view of a first touch pattern and the pixel matrix of FIG. 4.
FIG. 7(b) is a top view of a second touch pattern and the pixel matrix of FIG. 5.
FIG. 7(c) is a top view of the first touch pattern, the second touch pattern, and the pixel matrix of FIG. 6.
Figure 7:
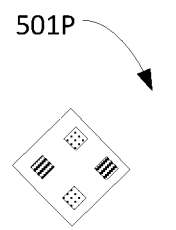
Figure 7:
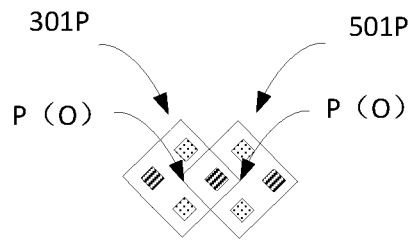

The first touch electrode layer 300 includes a plurality of first touch metal wires 3011 and a plurality of second touch metal wires 3012 intersecting each other. The plurality of first touch metal wires 3011 and the plurality of second touch metal wires 3012 intersect each other to form a plurality of first touch patterns 301P arranged in an array. Please refer to FIG. 7(a), each of the first touch patterns 301P has a shape of diamond. The plurality of first touch metal wires 3011 extend along a third direction D3 and are arranged at intervals along a fourth direction D4. The plurality of second touch metal wires 3012 extend along the fourth direction D4 and are arranged at intervals along the third direction D3.

The first touch electrode layer 300 includes a plurality of first touch electrodes 301 and a plurality of first dummy electrodes 301D each disposed between two adjacent first touch electrodes 301. The first dummy electrodes 301D are insulated from the first touch electrodes 301 through a plurality of first breakages 3013 provided in the first touch metal wires 3011. The plurality of first breakages 3013 are arranged according to certain rules to make the first touch electrode 301 constitute a variety of patterns, for example strip or diamond, branch patterns, etc. In this embodiment, the plurality of first breakages 3013 (also called gaps) are arranged along the first direction D1, that is to say the plurality of first breakages 3013 are longitudinally arranged. Two columns of longitudinally arranged first breakage 3013 divide the plurality of first touch patterns 301P originally connected to each other into two strip-shaped first touch electrodes 301 and the first dummy electrode 301D located between the two strip-shaped first touch electrodes 301. Each of the first dummy electrode 301D is a floating pattern, which is insulated from other electrodes. A capacitance to earth of the first touch electrode 301 can be adjusted by adjusting a width and an area of the first dummy electrode 301D.

The second touch electrode layer 500 includes a plurality of third touch metal wires 5011 and a plurality of fourth touch metal wires 5012 intersecting each other. The plurality of third touch metal wires 5011 and the plurality of fourth touch metal wires 5012 intersect each other to form a plurality of second touch patterns 501P arranged in an array. Please refer to FIG. 7(b), each of the second touch patterns 501P has a shape of diamond. The plurality of third touch metal wires 5011 extend along the third direction D3 and are arranged at intervals along the fourth direction D4. The plurality of fourth touch metal wires 5012 extend along the fourth direction D4 and are arranged at intervals along the third direction D3. In one embodiment, a size of the first touch pattern 301P is same as that of the second touch pattern 501P, that is to say, a length of side of the first touch pattern 301P is same as that of the second touch pattern 501P.

The second electrode layer 500 includes a plurality of second touch electrodes 501 and a plurality of second dummy electrodes 501D each disposed between two adjacent second touch electrodes 501. The second dummy electrodes 501D are insulated from the second touch electrodes 501 through a plurality of second breakages 5013 provided in the second touch metal wires 5012. The plurality of second breakages 5013 are arranged according to certain rules to make the second touch electrode 501 constitute a variety of patterns, for example strip or diamond, branch patterns, etc. In this embodiment, the plurality of second breakages 5013 (also called gaps) are arranged along the second direction D2. The first direction D1 is perpendicular to the second direction D2. That is to say, the plurality of second breakages 5013 are horizontally arranged. Two rows of horizontally arranged second breakages 5013 divide the plurality of second touch patterns 501P originally connected to each other into two strip-shaped second touch electrodes 501 and the second dummy electrode 501D located between the two strip-shaped second touch electrodes 501. Each of the second dummy electrode 501D is a floating pattern, which is insulated from other electrodes. A capacitance to earth of the second touch electrode 501 can be adjusted by adjusting a width and an area of the second dummy electrode 501D.

In this embodiment, the first touch electrodes 301 in the first touch electrode layer 300 are longitudinally arranged, and the second touch electrodes 501 in the second touch electrode layer 500 are horizontally arranged, and they are disposed in different layers to constitute mutual capacitive touch sensing patterns. As shown in FIG. 6, FIG. 6 is a top view of the first touch electrode layer 300, the second touch electrode layer 500, and the pixel matrix according to the embodiment. For convenience of illustration, the first touch electrode layer 300 is represented by a thicker line. In the top view, the first touch metal wires 3011 and the third touch metal wires 5011 are arranged alternately at intervals in an order of one of the first touch metal wires 3011 by one of the third touch metal wires 5011, and the second touch metal wires 3012 and the fourth touch metal wires 5012 are arranged alternately at intervals in an order of one of the second touch metal wires 3012 by one of the fourth touch metal wires 5012. Vertical distances between each two adjacent touch metal wires can be equal. Please refer to FIG. 7(c). The first touch electrode layer 300 and the second touch electrode layer 500 are arranged in following way: in the top view, a center O of each of the first touch patterns 301P overlaps an endpoint P of one of the second touch patterns 501P, and a center O of the second touch pattern 501P overlaps an endpoint P of the first touch pattern 301P. Herein, only a relative position relationship between one of the first touch pattern 301P and one of the second touch pattern 501P is illustrated, as the first touch patterns 301P of the first touch electrode layer 300 and the second touch patterns 501P of the second touch electrode layer 500 are arranged in an array respectively, a relative position relationship between the first touch electrode layer 300 and the second touch electrode layer 500 can be determined. Moreover, only a relative position relationship between one of the first touch patterns 301P and one of the second touch patterns 501P which overlaps the first touch pattern 301P at the horizontal direction is illustrated. In this embodiment, a relative position relationship between one of the first touch patterns 301P and one of the second touch patterns 501P which overlaps the first touch pattern 301P in the vertical direction can also be illustrated as following: in the top view, a center O of each of the first touch patterns 301P overlaps an endpoint P of one of the second touch patterns 501P, and a center O of the second touch pattern 501P overlaps an endpoint P of the first touch pattern 301P. In this embodiment, an example of a same length of side of the first touch patterns 301P and the second touch patterns 501P is taken as example, but in other embodiments of the present application, the length of side of the first touch patterns 301P can be different from that of the second touch patterns 501P, as long as in the top view, each of the first touch metal wires 3011 is staggered with each of the third touch metal wires 5011, and each of the second touch metal wires 3012 and is staggered with each of the fourth touch metal wires 5012. In this embodiment, due to metal mesh electrode structures arranged according to certain rules, moiré fringes caused by overlapping of upper and lower metal mesh which affects optical effect can be prevented.

In the present application, there are no restrictions in arrangement of pixel units in the display module 11. The arrangement of pixel units in the display module 11 of the present application can be any one of pixel arrangement ways in the prior art, for example, an RBG side-by-side arrangement. In the present application, the arrangement of pixel units of the display module 11 can be a Pentile (P) arrangement. The display module 11 includes a plurality of sub-pixels SP in the P arrangement. The plurality of sub-pixels SP constitute a pixel matrix. As shown in FIG. 5 and FIG. 6, in one embodiment, a pixel structure in the Pentile arrangement is configured according to following way: a plurality of first pixels P1 each including a green sub-pixel G and a red sub-pixel R are arranged along the third direction D3 at intervals, a plurality of second pixels P2 each including a green sub-pixel G and a blue sub-pixel B are arranged along the third direction D3 at intervals, and a column of the first pixels P1 and a column of the second pixels P2 are arranged along the fourth direction D4 at intervals. The third direction D3 and the fourth direction D4 can be same or different from the first direction D1 and the second direction D2. In this embodiment, the third direction D3 and the fourth direction D4 are different from the first direction D1 and the second direction D2. The third direction D3 is perpendicular to the fourth direction D4. For example, the third direction D3 forms an angle of 30 to 60 degrees with the second direction D2. In the top view, each of the first touch patterns 301P surrounds four sub-pixels including two green sub-pixels G, one red sub-pixel R, and one blue sub-pixel B. Each of the second touch patterns 501P surrounds four sub-pixels including two green sub-pixels G, one red sub-pixel R, and one blue sub-pixel B. In the top view, each of the sub-pixels is surrounded by the touch metal wires. That is to say, each of the sub-pixels is located in a range of an orthographic projection of the touch metal wires on a plane constructed by the sub-pixels. The touch metal wire is a general term for the first touch metal wires 3011, the second touch metal wires 3012, the third touch metal wires 5011, and the fourth touch metal wires 5012. In the top view, each of the sub-pixels is surrounded by one first touch metal wire 3011, one second touch metal wire 3012, one third touch metal wire 5011, and one fourth touch metal wire 5012. That is to say, each of the sub-pixels is located in a range of an orthographic projection of one first touch metal wire 3011, one second touch metal wire 3012, one third touch metal wire 5011, and one fourth touch metal wire 5012 on a plane constructed by the sub-pixels. As a result, luminance throughout the touch display area 1A of the touch display device 1 remains consistent.

Figure 8:
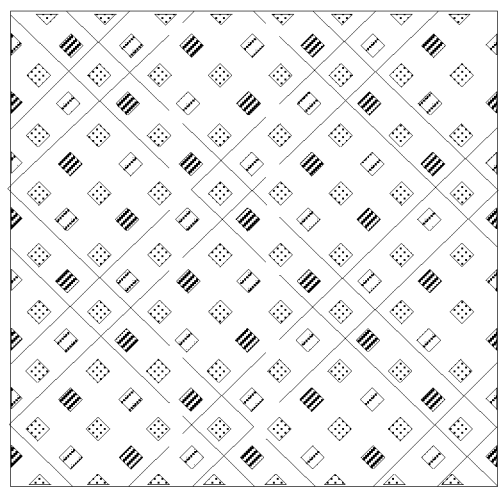
FIG. 8 is a top view of the first touch electrode layer and the pixel matrix of the touch display device according to yet another embodiment of the present application.
Figure 9:
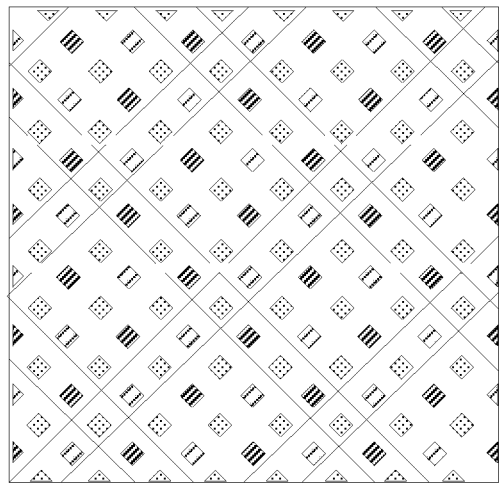
FIG. 9 is a top view of the second touch electrode layer and the pixel matrix of the touch display device of FIG. 8.
Figure 10:
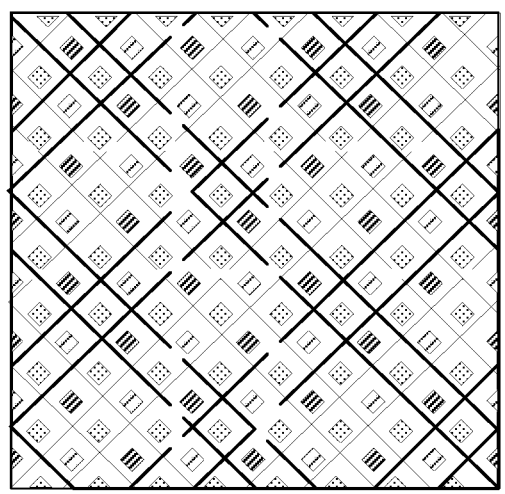
FIG. 10 is a top view of the first touch electrode layer, the second touch electrode layer, and the pixel matrix of the touch display device of FIG. 8.

Referring to FIG. 8 to FIG. 10, the structure of the touch display device 1 according to yet another embodiment of the present application is almost same as that of the touch display device 1 of the first embodiment, and only differs in structures of the touch patterns of the first touch electrode layer 300 and the second touch electrode layer 500. In this embodiment, please refer to FIG. 11(a), the first touch pattern 301P' includes a big diamond formed by two of the first touch metal wires 3011 and two of the second touch metal wires 3012 intersecting each other, and one of the first touch metal wires 3011 and one of the second touch metal wires 3012 are located on a position of one quarter length of each side of an included angle α of the big diamond. As a result, the big diamond is divided into two small diamonds connected to each other and two parallelograms on both sides of the two small diamonds. Please refer to FIG. 11(b), the second touch pattern 501P' includes a big diamond formed by two of the first touch metal wires 3011 and two of the second touch metal wires 3012 intersecting each other, and one of the third touch metal wires 5011 and one of the fourth touch metal wires 5012 are located on a position of one quarter length of each side of an included angle α of the big diamond. As a result, the big diamond is divided into two small diamonds connected to each other and two parallelograms on both sides of the two small diamonds. In one embodiment, a shape and a size of the first touch pattern 301P' is same as that of the second touch pattern 501P'.

A vertex of the included angle α of the first touch pattern 301P' is defined as a first endpoint P1, a vertex opposite to the included angle α is defined as a second endpoint P2, a vertex of the included angle α of the second touch pattern 501P' is defined as a first endpoint P1, and a vertex opposite to the included angle α is defined as a second endpoint P2. In the top view, the first endpoint P1 of each first touch pattern 301P' overlaps a center O of one of the second touch patterns 501P', and a center O of the first touch pattern 301P' overlaps the second endpoint P2 of the second touch pattern 501P'. As a result, in the top view, the first touch metal wires 3011 and the third touch metal wires 5011 are arranged alternately at intervals in an order of two of the first touch metal wires 3011 by two of the third touch metal wires 5011, and the second touch metal wires 3012 and the fourth touch metal wires 5012 are arranged alternately at intervals in an order of two of the second touch metal wires 3012 and by two of the fourth touch metal wires 5012.

In this embodiment, due to metal mesh electrode structures arranged according to certain rules, Moire fringes caused by overlapping of upper and lower metal mesh which affects optical effect can be prevented.

Figure 11:
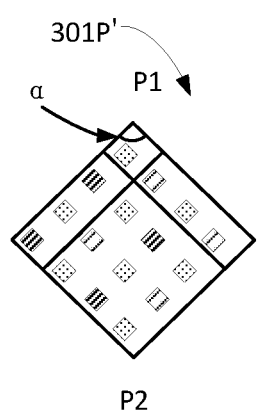
FIG. 11(a) is a top view of the first touch pattern and the pixel matrix of FIG. 8.
FIG. 11(b) is a top view of the second touch pattern and the pixel matrix of FIG. 9.
FIG. 11(c) is a top view of the first touch pattern, the second touch pattern, and the pixel matrix of FIG. 10.
Figure 11:
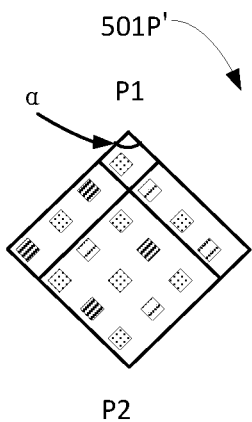
Figure 11:
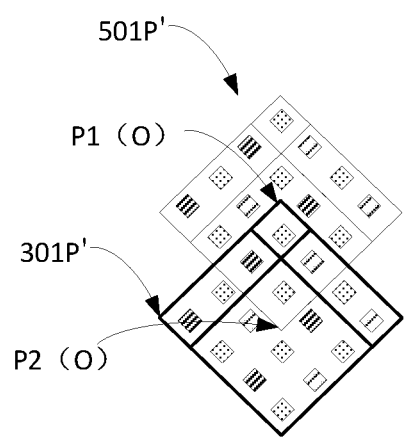

Please refer to FIG. 11(a) to FIG. 11(c). In the top view, each of the first touch patterns 301P' surrounds sixteen sub-pixels including eight green sub-pixels G, four red sub-pixels R, and four blue sub-pixels B. Each of the second touch patterns 501P' surrounds sixteen sub-pixels including eight green sub-pixels G, four red sub-pixels R, and four blue sub-pixels B. An arrangement of the sixteen sub-pixels surrounded by the first touch patterns 301P' is same as that surrounded by the second touch patterns 501P'. In the top view, each of the sub-pixels is surrounded by the touch metal wires. That is to say, each of the sub-pixels is located in a range of an orthographic projection of the touch metal wires on a plane constructed by the sub-pixels. The touch metal wire is a general term for the first touch metal wires 3011, the second touch metal wires 3012, the third touch metal wires 5011, and the fourth touch metal wires 5012. As a result, luminance throughout the touch display area 1A of the touch display device 1 remains consistent.

In this embodiment, the first dummy electrodes 301D, the second dummy electrodes 501D, the first breakages 3013, and the second breakages 2013 are same as that of the above-mentioned embodiments, and detailed illustration is omitted herein.

Figure 12:
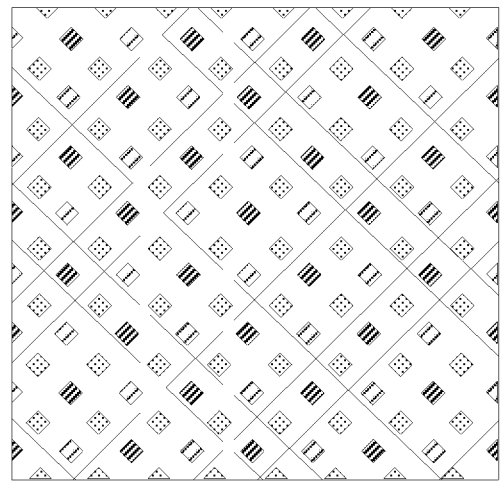
FIG. 12 is a top view of the first touch electrode layer and the pixel matrix of the touch display device according to still another embodiment of the present application.
Figure 13:
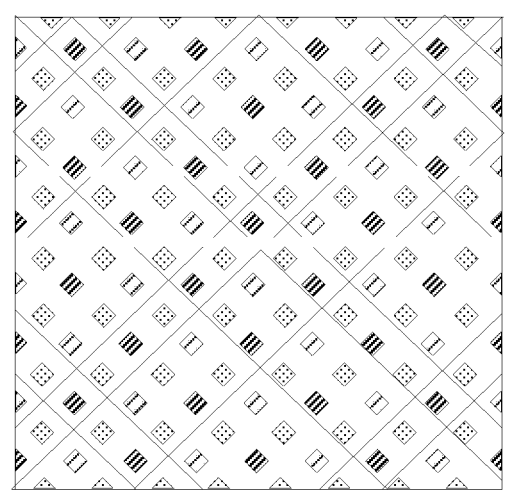
FIG. 13 is a top view of the second touch electrode layer and the pixel matrix of the touch display device of FIG. 12.
Figure 14:
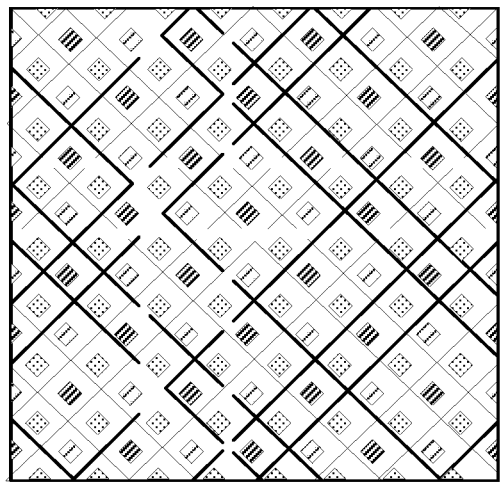
FIG. 14 is a top view of the first touch electrode layer, the second touch electrode layer, and the pixel matrix of the touch display device of FIG. 12.

Referring to FIG. 12 to FIG. 14, the structure of the touch display device 1 according to still another embodiment of the application is almost same as that of the touch display device 1 of the first embodiment, and only differs in structures of the touch patterns of the first touch electrode layer 300 and the second touch electrode layer 500. In this embodiment, please refer to FIG. 15(a), the first touch pattern 301P''' includes a big diamond formed by two of the first touch metal wires 3011 and two of the second touch metal wires 3012 intersecting each other, and two of the first touch metal wires 3011 and two of the second touch metal wires 3012 are located on positions of one-sixth length and one-half length of each side of an included angle α of the big diamond. As a result, the big diamond is divided into two to three small diamonds connected to each other and four parallelograms on both sides of the three small diamonds. Please refer to FIG. 15(b), the second touch pattern 301''' includes a big diamond formed by two of the first touch metal wires 5011 and two of the second touch metal wires 5012 intersecting each other, and two of the third touch metal wires 5011 and two of the fourth touch metal wires 5012 are located on positions of one-sixth length and one-half length of each side of an included angle α of the big diamond. As a result, the big diamond is divided into two to three small diamonds connected to each other and four parallelograms on both sides of the three small diamonds. In this embodiment, a size of the first touch pattern 301P''' is same as that of the second touch pattern 501P''', that is to say, lengths of side of both big diamonds are same.

A vertex of the included angle α of the first touch pattern 301P''' is defined as a first vertex P1, a vertex opposite to the included angle α is defined as a second vertex P2, a vertex of the included angle α of the second touch pattern 501P''' is defined as a first vertex P1, and a vertex opposite to the included angle α is defined as a second vertex P2. In this embodiment, each connecting lines of the first vertex P1 and the second vertex P2 is parallel to the second direction D2. The first touch electrode layer 300 and the second touch electrode layer 500 is configured in following way: in the top view, the second vertex P2 of the second touch pattern 501P''' is located on a position of a diagonal of the first touch pattern 301P''' which is one-sixth of a length of the diagonal from the first vertex P1, and the second vertex P2 of the first touch pattern 301P''' is located on a position of a diagonal of the second touch pattern 501P''' which is one-sixth of a length of the diagonal from the first vertex P1. As a result, in the top view, the first touch metal wires 3011 and the third touch metal wires 5011 are arranged alternately at intervals in an order of two of the third touch metal wires 5011, by two of the first touch metal wires 3011, by one of the third touch metal wire 5011, and by one of the first touch metal wires 3011 (from left to the right in the figures), and the second touch metal wires 3012 and the fourth touch metal wires 5012 are arranged alternately at intervals in an order of two of the second touch metal wires 3012, by two of the fourth touch metal wires 5012, by one of the second touch metal wires 3012, and by one of the fourth touch metal wires 5012 (from left to the right in the figures).

In this embodiment, due to metal mesh electrode structures arranged according to certain rules, Moire fringes caused by overlapping of upper and lower metal mesh which affects optical effect can be prevented.

Figure 15:
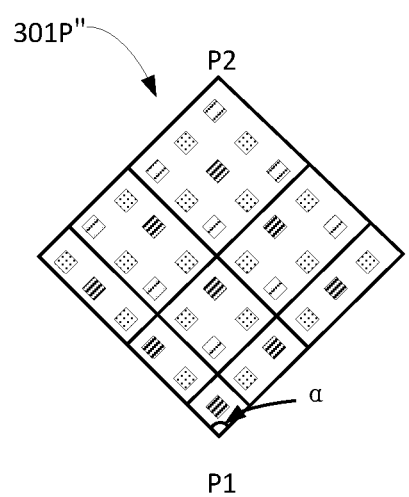
FIG. 15(a) is a top view of the first touch pattern and the pixel matrix of FIG. 12.
FIG. 15(b) is a top view of the second touch pattern and the pixel matrix of FIG. 13.
FIG. 15(c) is a top view of the first touch pattern, the second touch pattern, and the pixel matrix of FIG. 14.
Figure 15:
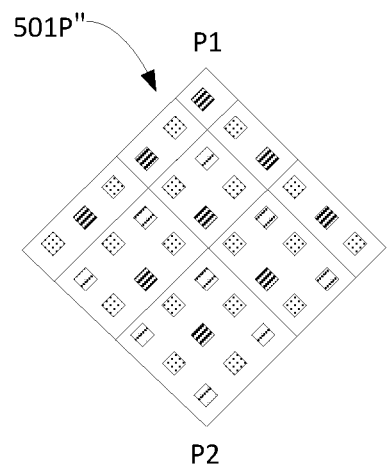
Figure 15:
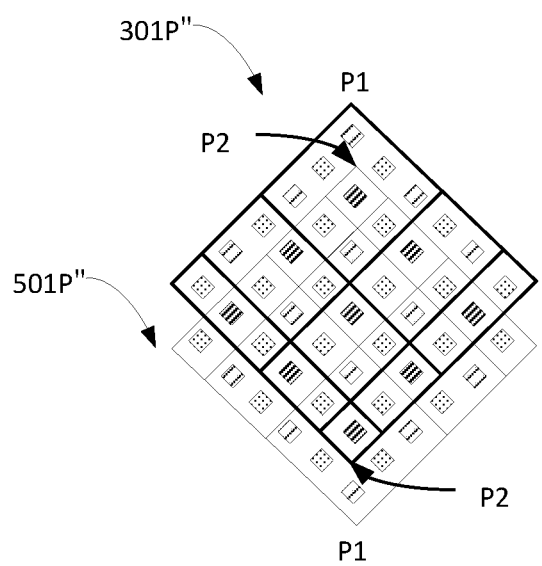

Please refer to FIG. 15(a) to FIG. 15(c), in the top view, each of the first touch patterns 301P''' surrounds thirty-six sub-pixels including eighteen green sub-pixels G, nine red sub-pixels R, and nine blue sub-pixels B. Each of the second touch patterns 501P''' surrounds thirty-six sub-pixels including eighteen green sub-pixels G, nine red sub-pixels R, and nine blue sub-pixels B. An arrangement of the thirty-six sub-pixels surrounded by the first touch patterns 301P''' is same as that surrounded by the second touch patterns 501P'''. In the top view, each of the sub-pixels is surrounded by the touch metal wires. That is to say, each of the sub-pixels is located in a range of an orthographic projection of the touch metal wires on a plane constructed by the sub-pixels. The touch metal wire is a general term of the first touch metal wires 3011, the second touch metal wires 3012, the third touch metal wires 5011, and the fourth touch metal wires 5012. As a result, luminance throughout the touch display area 1A of the touch display device 1 remains consistent.

In this embodiment, the first dummy electrodes 301D, the second dummy electrodes 501D, the first breakages, and the second breakages are same as that of the above-mentioned embodiments, and detailed illustration is omitted herein.

Compared to prior art, the touch driving electrodes and the touch sensing electrodes of on-cell touch are disposed on different layers according to the touch display devices provided by the present application, which can prevent inconsistency of optical effect induced by metal bridge connecting point in single-layer bridge connecting by vias design. As single-layer bridge connecting by vias design is avoided, risks in low-temperature dry etching processes are greatly reduced and bending reliability of flexible DOT panels is improved. Besides, due to metal mesh electrode structures arranged according to certain rules, Moire fringes caused by the overlap of upper and lower metal mesh which will affect the optical effect can be prevented.

The above description provides a detailed introduction to the present application. In the present application, specific examples are applied to explain principle and embodiments of the present application. The description of the above embodiments is only used to help understand the present application. At the same time, for those skilled in the art, according to the thought of the present application, there will be changes in the specific embodiments and application scope. In conclusion, the content of the specification should not be understood as the limitation of the application.

What is claimed is:

1. A touch display device, comprising a display module and a touch module stacked, wherein the touch module comprises a first touch electrode layer, a second touch electrode layer, and an insulating layer located between the first touch electrode layer and the second touch electrode layer;

the touch display device comprises a touch display area and a bonding area located on a side of the touch display area, a plurality of pads are configured in the bonding area, and the pads are disposed on the second touch electrode layer;

the first touch electrode layer comprises a plurality of first touch electrodes and a plurality of first leads each connected to one of the first touch electrodes;

the second touch electrode layer comprises a plurality of second touch electrodes and a plurality of second leads each connected to one of the second touch electrodes; and each of the first leads extends from one of the first touch electrodes to the bonding area and extends to the second touch electrode layer through a via provided in the insulating layer to electrically connect one of the pads, and each of the second leads extends from one of the second touch electrodes to the bonding area to electrically connect one of the pads;

wherein each of the first touch electrodes and the second touch electrodes is configured as a metal mesh structure, the first touch electrode layer comprises a plurality of first touch metal wires and a plurality of second touch metal wires intersecting each other, the plurality of first touch metal wires and the plurality of second touch metal wires intersect each other to form a plurality of first touch patterns arranged in an array, the plurality of first touch metal wires extend along a first direction and are arranged at intervals along a second direction, and the plurality of second touch metal wires extend along the second direction and are arranged at intervals along the first direction;

the second touch electrode layer comprises a plurality of third touch metal wires and a plurality of fourth touch metal wires intersecting each other, the plurality of third touch metal wires and the plurality of fourth touch metal wires intersect each other to form a plurality of second touch patterns arranged in an array, the plurality of third touch metal wires extend along the first direction and are arranged at intervals along the second direction, and the plurality of fourth touch metal wires extend along the second direction and are arranged at intervals along the first direction; and in a top view, the first touch metal wires and the third touch metal wires are arranged at intervals according to a certain rule, and the second touch metal wires and the fourth touch metal wires are arranged at intervals according to a certain rule.

2. The touch display device of claim 1, wherein in the top view, the first touch metal wires and the third touch metal wires are arranged alternately at intervals in an order of one of the first touch metal wires by one of the third touch metal wires, and the second touch metal wires and the fourth touch metal wires are arranged alternately at intervals in an order of one of the second touch metal wires by one of the fourth metal wires.

3. The touch display device of claim 2, wherein the first touch pattern has a shape of diamond, and the second touch pattern also has a shape of diamond, and a size of the first touch pattern is same as that of the second touch pattern, in the top view, a center of each of the first touch patterns overlaps an endpoint of one of the second touch patterns, and a center of the second touch pattern overlaps an endpoint of the first touch pattern.

4. The touch display device of claim 1, wherein in the top view, the first touch metal wires and the third touch metal wires are arranged alternately at intervals in an order of two of the first touch metal wires by two of the third touch metal wires, and the second touch metal wires and the fourth touch metal wires are arranged alternately at intervals in an order of two of the second touch metal wires by two of the fourth touch metal wires.

5. The touch display device of claim 4, wherein the first touch pattern comprises a big diamond formed by two of the first touch metal wires and two of the second touch metal wires intersecting each other, and one of the first touch metal wires and one of the second touch metal wires are located on a position of one quarter length of each side of an included angle of the big diamond to divide the big diamond to two small diamonds connected to each other and two parallelograms on both sides of the two small diamonds;

the second touch pattern also comprises a big diamond formed by two of the first touch metal wires and two of the second touch metal wires intersecting each other, and one of the first touch metal wires and one of the second touch metal wires are located on a position of one quarter length of each side of an included angle of the big diamond to divide the big diamond to two small diamonds connected to each other and two parallelograms on both sides of the two small diamonds, and a size of the first touch pattern is same as that of the second touch pattern; and a vertex of the included angle of the first touch pattern is defined as a first endpoint, a vertex opposite to the included angle of the first touch pattern is defined as a second endpoint, a vertex of the included angle of the second touch pattern is defined as a first endpoint, a vertex opposite to the included angle of the second touch pattern is defined as a second endpoint, in the top view, the first endpoint of each of the first touch patterns overlaps a center of one of the second touch patterns, and a center of the first touch pattern overlaps the second endpoint of the second touch pattern.

6. The touch display device of claim 1, wherein in the top view, the first touch metal wires and the third touch metal wires are arranged alternately at intervals in an order of two of the third touch metal wires, by two of the first touch metal wires, by one of the third touch metal wires, and by one of the first touch metal wires, and the second touch metal wires and the fourth touch metal wires are arranged alternately at intervals in an order of two of the second touch metal wires, by two of the fourth touch metal wires, by one of the second touch metal wires, and by one of the fourth touch metal wires.

7. The touch display device of claim 6, wherein the first touch pattern comprises a big diamond formed by two of the first touch metal wires and two of the second touch metal wires intersecting each other, and two of the first touch metal wires and two of the second touch metal wires are located on positions of one-sixth length and one-half length of each side of an included angle of the big diamond to divide the big diamond to three small diamonds connected to each other and four parallelograms on both sides of the three small diamonds, the second touch pattern also comprises a big diamond formed by two of the third touch metal wires and two of the fourth touch metal wires intersecting each other, and two of the third touch metal wires and two of the fourth touch metal wires are located on positions of one-sixth length and one-half length of each side of an included angle of the big diamond to divide the big diamond to three small diamonds connected to each other and four parallelograms on both sides of the three small diamonds, and a size of the first touch pattern is same as that of the second touch pattern; and a vertex of the included angle of the first touch pattern is defined as a first endpoint, a vertex opposite to the included angle of the first touch pattern is defined as a second endpoint, a vertex of the included angle of the second touch pattern is defined as a first endpoint, a vertex opposite to the included angle of the second touch pattern is defined as a second endpoint, in the top view, the second endpoint of the second touch pattern is located on a position of a diagonal of the first touch pattern which is one-sixth of a length of the diagonal from the first endpoint, and the second endpoint of the first touch pattern is located on a position of a diagonal of the second touch pattern which is one-sixth of a length of the diagonal from the first endpoint.

8. The touch display device of claim 1, wherein the first touch electrode layer comprises the plurality of first touch electrodes and a plurality of first dummy electrodes each disposed between two adjacent first touch electrodes, the first dummy electrodes are insulated from the first touch electrodes through a plurality of first breakages provided in the first touch metal wires, and the second touch electrode layer comprises the plurality of second touch electrodes and a plurality of second dummy electrodes each disposed between two adjacent second touch electrodes, the second dummy electrodes are insulated from the first touch electrodes through a plurality of second breakages provided in the second touch metal wires.

9. The touch display device of claim 8, wherein the plurality of first touch electrodes form a plurality of strip, diamond, or branch patterns due to the plurality of first breakages.

10. The touch display device of claim 8, wherein the plurality of second touch electrodes form a plurality of strip, diamond, or branch patterns due to the plurality of second breakages.

11. The touch display device of claim 1, wherein the display module comprises a plurality of sub-pixels in a Pentile arrangement, in the top view, each of the sub-pixels is surrounded by the touch metal wires.

12. The touch display device of claim 11, wherein the plurality of sub-pixels in the Pentile arrangement is configured according to following way: a plurality of first pixels each comprising a green sub-pixel and a red sub-pixel are arranged along a third direction at intervals, a plurality of second pixels each comprising a green sub-pixel and a blue sub-pixel are arranged along the third direction at intervals, a column of the first pixels and a column of the second pixels are arranged along the fourth direction at intervals.

13. The touch display device of claim 12, wherein in the top view, each of the first touch patterns surrounds four sub-pixels comprising two green sub-pixels, one red sub-pixel R, and one blue sub-pixel, and each of the second touch pattern surrounds four sub-pixels comprising two green sub-pixels, one red sub-pixel, and one blue sub-pixel.

14. The touch display device of claim 12, wherein in the top view, each of the first touch patterns surrounds sixteen sub-pixels comprising eight green sub-pixels G, four red sub-pixels R, and four blue sub-pixels B, and each of the second touch patterns surrounds sixteen sub-pixels comprising eight green sub-pixels G, four red sub-pixels R, and four blue sub-pixels B.

15. The touch display device of claim 12, wherein in the top view, each of the first touch patterns surrounds thirty-six sub-pixels comprising eighteen green sub-pixels G, nine red sub-pixels R, and nine blue sub-pixels B, and each of the second touch pattern surrounds thirty-six sub-pixels comprising eighteen green sub-pixels G, nine red sub-pixels R, and nine blue sub-pixels B.

* * * * *